(12) United States Patent
Nohtomi

(10) Patent No.: US 11,204,669 B2
(45) Date of Patent: Dec. 21, 2021

(54) CONTROLLING A VOLTAGE OF A DISPLAY PANEL

(71) Applicant: Creative Legend Semiconductor (Hong Kong) Limited, Hong Kong (CN)

(72) Inventor: Shinobu Nohtomi, Tokyo (JP)

(73) Assignee: OMNIVISION TDDI ONTARIO LIMITED PARTNERSHIP, Grand Cayman (KY)

( * ) Notice: Subject to any disclaimer, the term of this patent is extended or adjusted under 35 U.S.C. 154(b) by 0 days.

(21) Appl. No.: 16/755,447

(22) PCT Filed: Oct. 18, 2018

(86) PCT No.: PCT/IB2018/001273
§ 371 (c)(1),
(2) Date: Apr. 10, 2020

(87) PCT Pub. No.: WO2019/106422
PCT Pub. Date: Jun. 6, 2019

(65) Prior Publication Data
US 2020/0241666 A1    Jul. 30, 2020

(30) Foreign Application Priority Data

Oct. 19, 2017  (JP) .............................. JP2017-203010
Feb. 20, 2018  (JP) .............................. JP2018-028334

(51) Int. Cl.
*G06F 3/044*    (2006.01)
*G06F 3/041*    (2006.01)
*G09G 3/34*     (2006.01)

(52) U.S. Cl.
CPC ............ *G06F 3/044* (2013.01); *G06F 3/0412* (2013.01); *G09G 3/34* (2013.01); *G09G 2310/0272* (2013.01)

(58) Field of Classification Search
None
See application file for complete search history.

(56) References Cited

U.S. PATENT DOCUMENTS

| | | |
|---|---|---|
| 2009/0122047 A1 | 5/2009 | Yamamoto et al. |
| 2010/0328257 A1 | 12/2010 | Noguchi et al. |
| 2012/0224343 A1 | 9/2012 | Sato |
| 2013/0328807 A1 | 12/2013 | Matsumoto |
| 2018/0107317 A1* | 4/2018 | Tanaka .................. G06F 3/0412 |

OTHER PUBLICATIONS

International Search Report and Written Opinion, Interantional Patent Application # PCT/IB2018/01273, dated Feb. 27, 2019 consists of 16 pages.

\* cited by examiner

*Primary Examiner* — Aneeta Yodichkas
(74) *Attorney, Agent, or Firm* — Christensen O'Connor Johnson Kindness PLLC

(57) ABSTRACT

A display device comprises: a display panel comprising a plurality of pixel regions each comprising one or more pixels; a plurality of receiver electrodes respectively associated with the plurality of pixel regions and configured to supply a VCOM voltage; and data write lines configured to transmit data write signals for writing display data into the plurality of pixel regions. One or more but not all of the plurality of receiver electrodes fail to supply the VCOM voltage, while the display data are being written into one or more but not all of the plurality of pixel regions.

20 Claims, 17 Drawing Sheets

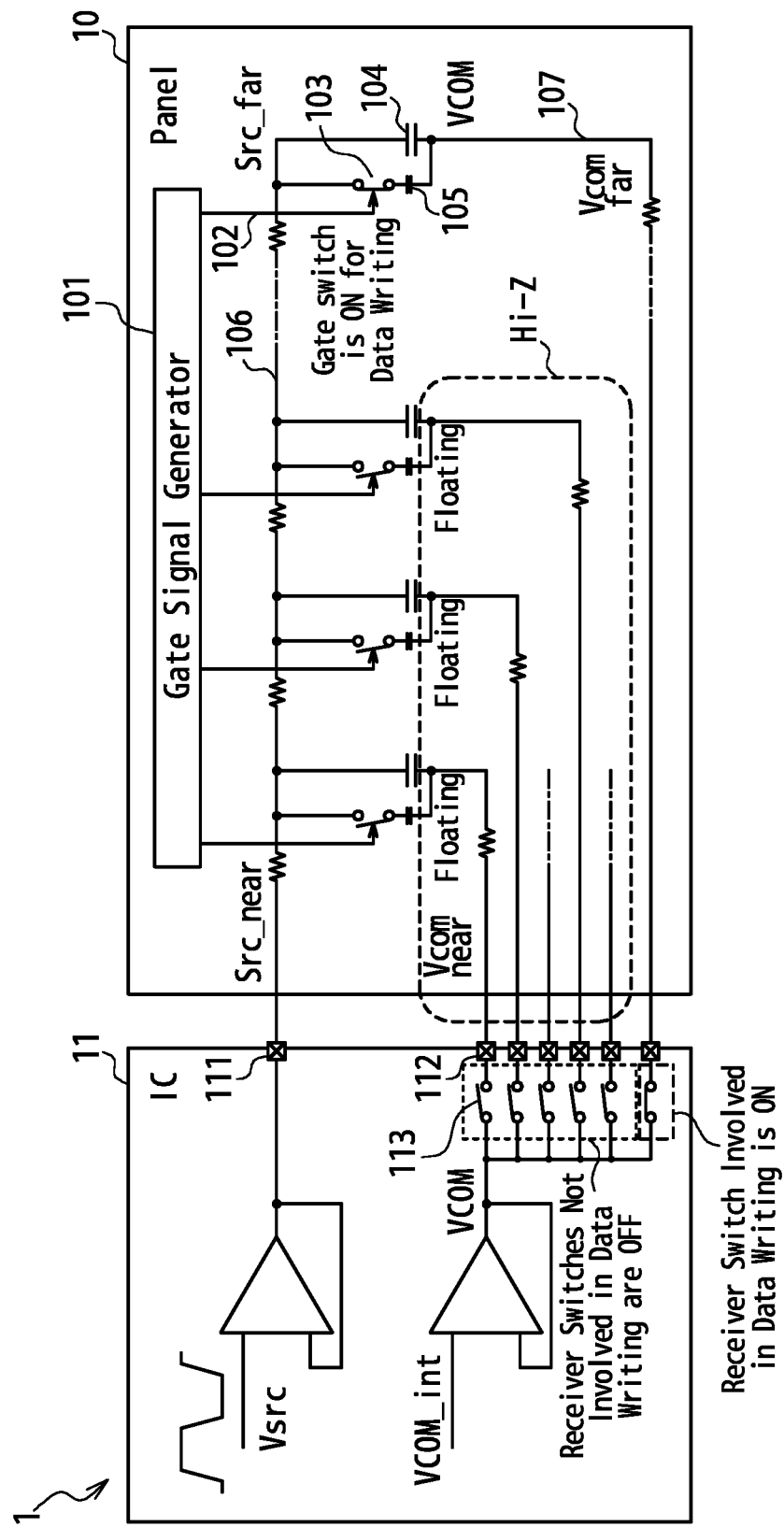

Fig. 2B

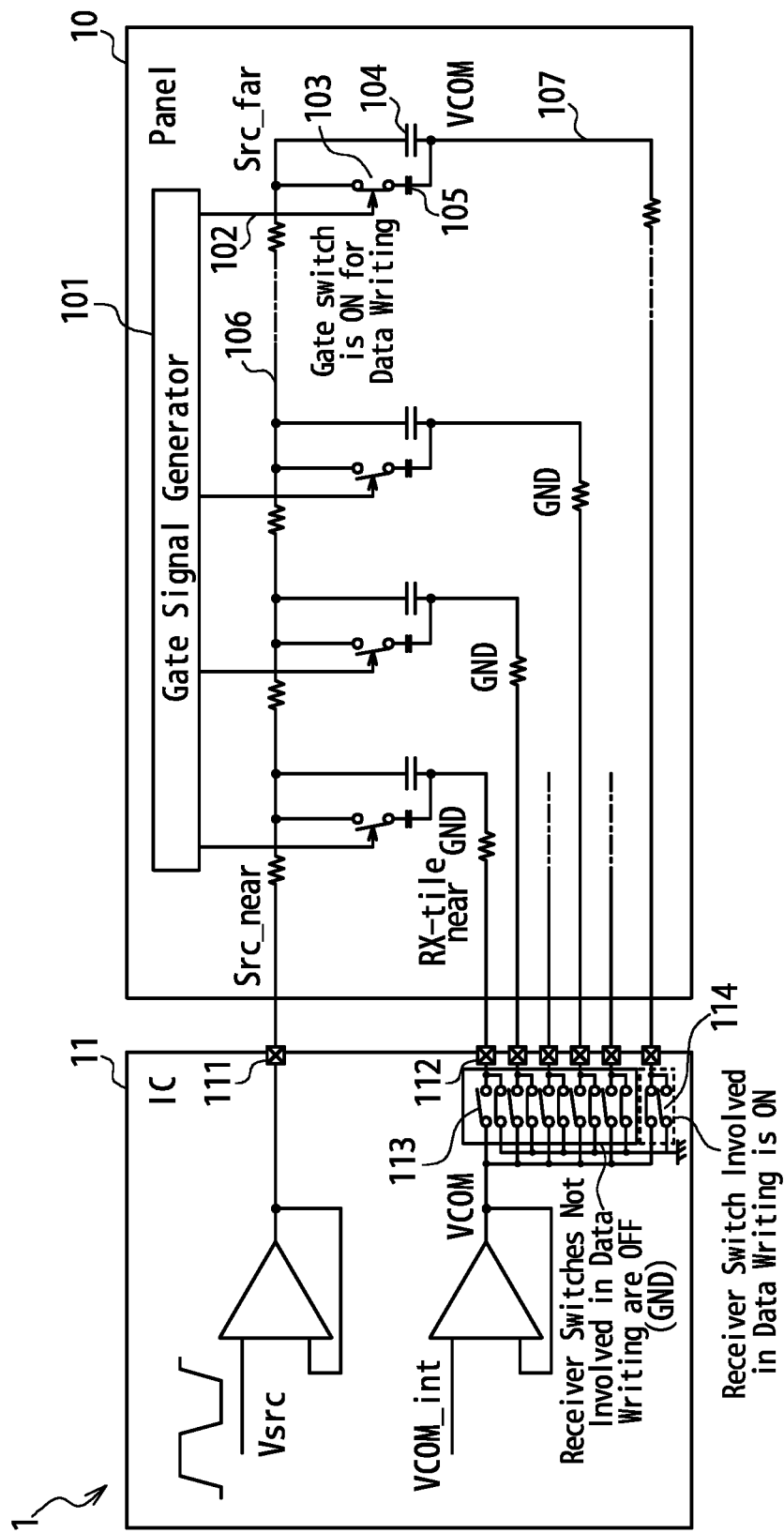

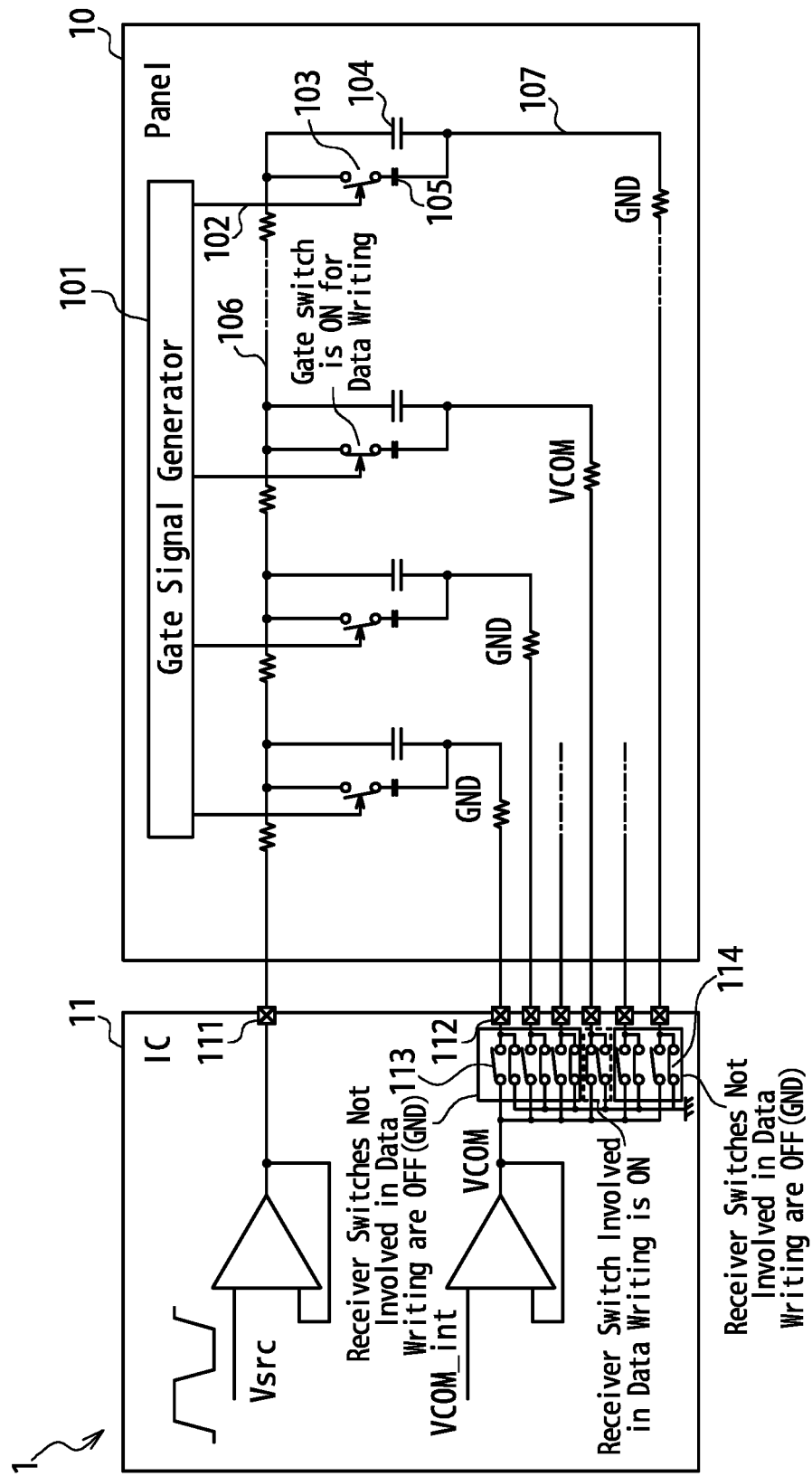

(A) Tile into which Data are Being Written
(B) Tile adjacent to Tile into which Data are Being Written
(C) Hi-Z

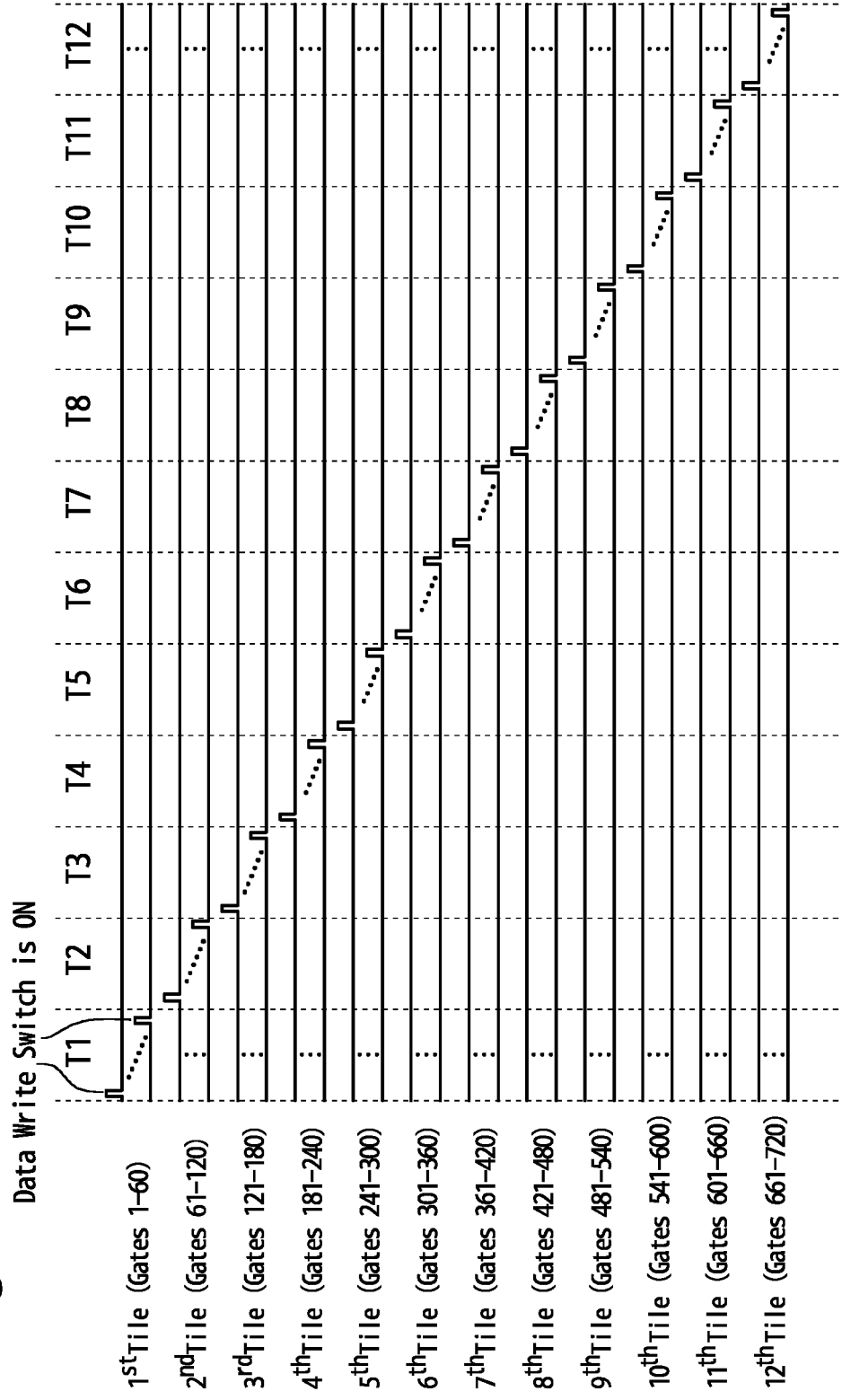

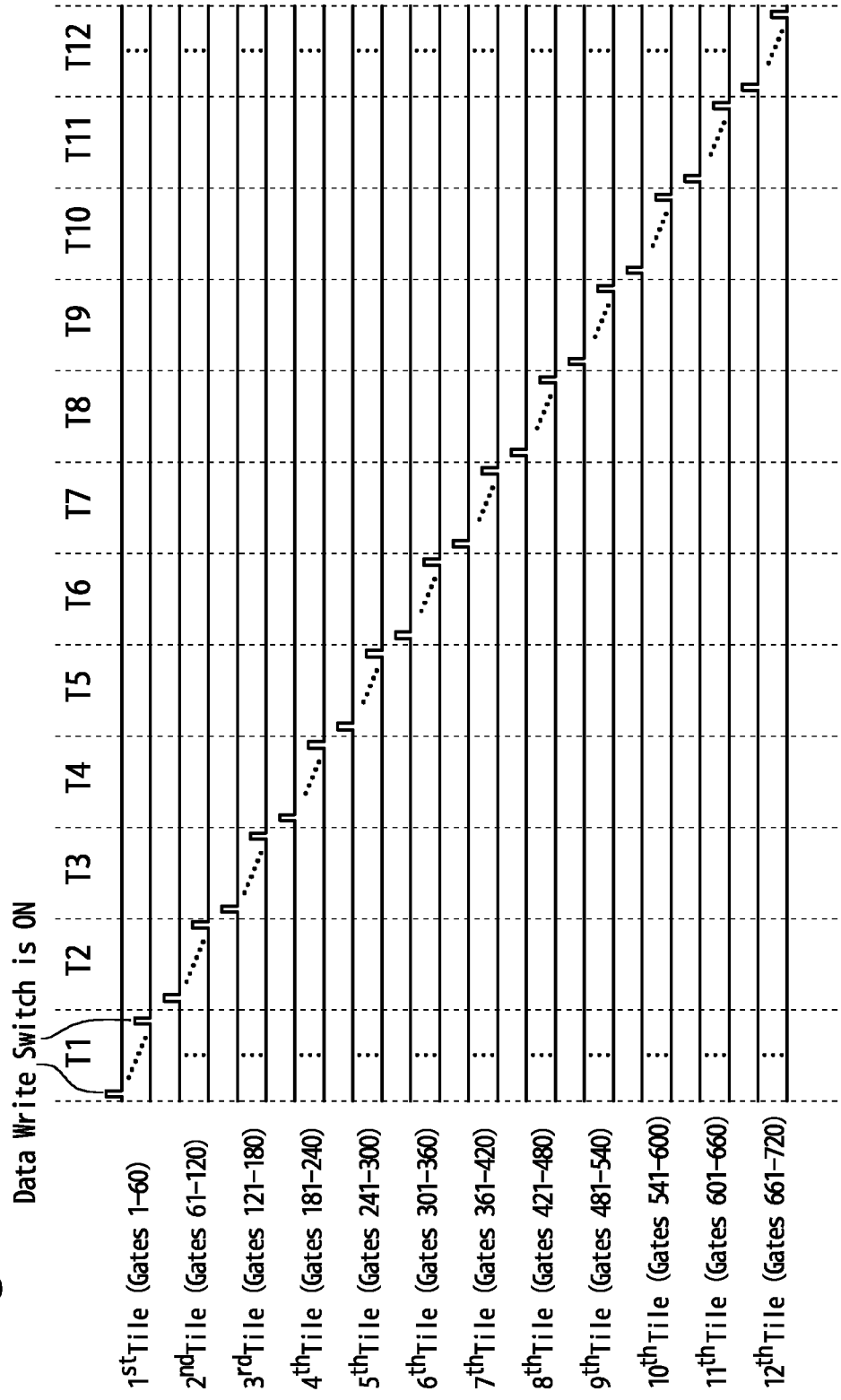

CONTROLLING A VOLTAGE OF A DISPLAY PANEL

CROSS-REFERENCE TO RELATED APPLICATIONS

This application claims priority to Japanese patent application No. 2017-203010, filed on Oct. 19, 2017 and Japanese patent application No. 2018-28334, filed on Feb. 20, 2018, and claims benefit of PCT Application Serial No. PCT/IB2018/001273 filed on Nov. 15, 2018, the disclosures of which are incorporated herein by reference in its entirety.

TECHNICAL FIELD

The present invention relates to a display device, voltage control method for a display panel, and a display driver.

BACKGROUND ART

A display device which has a display function of displaying information for user on a panel and a sensing function of sensing a touch input through an object such as a user's finger and a stylus may use a plurality of VCOM electrodes or common electrodes integrated in a panel as receiver electrodes for sensing.

Receiver switches may be connected to the receiver electrodes, respectively, and all of the receiver switches may be turned on while display data are displayed on the panel to supply a VCOM voltage (or common voltage) to the panel from all of the receiver electrodes. This may increase a consumed current in the display device.

The present invention reduces the parasitic capacitance by limiting the supply of the VCOM voltage to the panel via the RX electrode the data writing portion and making the other RX electrodes floating. The write characteristics are improved by reducing the parasitic capacitance, and the power consumption can be reduced by reducing the charge/discharge current.

SUMMARY

In one embodiment, a display panel comprises: a display panel comprising a plurality of pixel regions each comprising one or more pixels; a plurality of receiver electrodes respectively associated with the plurality of pixel regions and configured to supply a VCOM voltage; and data write lines configured to transmit data write signals for writing display data into the plurality of pixel regions. One or more but not all of the plurality of receiver electrodes fail to supply the VCOM voltage while the display data are written into one or more but not all of the plurality of pixel regions.

BRIEF DESCRIPTION OF DRAWINGS

FIGS. 2A and 2B illustrate example configurations of an IC and a panel of a display device, according to one embodiment;
FIGS. 4A and 4B illustrate different example configurations of the IC and the panel of the display device, according to one embodiment;

FIG. 8A illustrates one example switching timing of VCOM voltage supply by data write switches during gate scanning, according to one embodiment;
FIG. 9A illustrates one example switching timing of VCOM voltage supply by data write switches during gate scanning, according to one embodiment.

DESCRIPTION OF EMBODIMENTS

Figure 1:
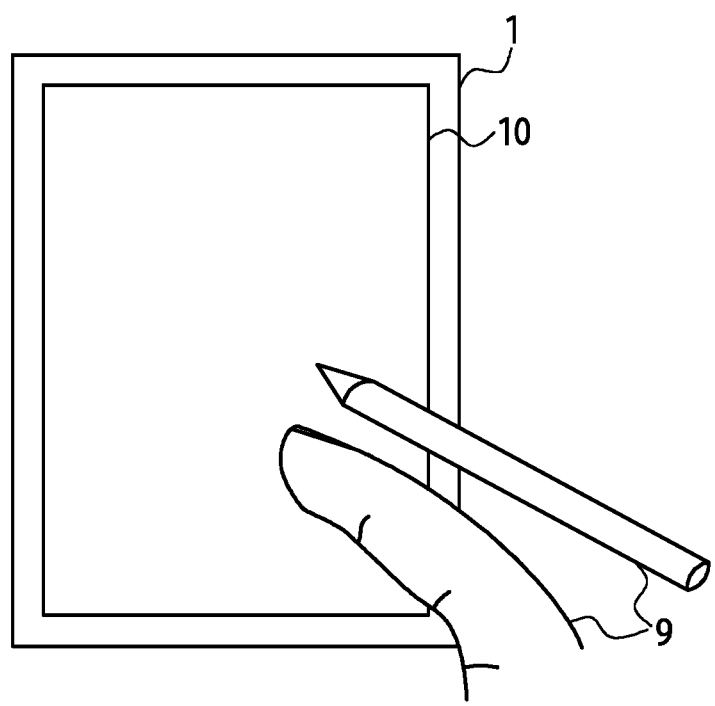
FIG. 1 illustrates an example display device.

In the following, a detailed description is given of embodiments of technologies disclosed herein with reference to attached drawings. Similar elements are denoted by similar reference numerals in the attached drawings. The detailed description given below provides mere examples, which are not intended to give limitation to the disclosed technologies and uses of the disclosed technologies. There is no intention to demarcate the scope with an explicit or implicit idea which has been presented in the above-described technical field, background art, and summary and a detailed description which will be presented in the following, either. Although details of various features will be described for sufficient understanding of the disclosed technologies, it would be apparent that a person skilled in the art can implement the disclosed technologies without the details. To prevent the description from being unnecessarily complicated, a detailed description is not given of commonly-known features.

A display device 1 exemplarily illustrated in FIG. 1 comprises a panel 10 and has a display function of displaying information for a user on the panel 10. The display device 1 is one example electronic appliance equipped with a panel. The electronic appliance may include, for example, a mobile electronic appliance, a smart phone, a laptop computer, a netbook computer, a tablet, a web browser, an electronics book reader, and a personal digital assistant (PDA). The electronic appliance may be a device of any size and shape, including a desktop computer equipped with a display panel and an automobile for which a display panel is used. The electronic appliance is not limited to a technical field in which a panel is used.

The display device 1 may have a sensing function of sensing an input through the panel 10 by one or more objects 9 (such as a finger and a stylus) manipulated by a user.

In one embodiment, the panel 10 may comprise an in-cell touch panel which has both display and sensing functions. In one embodiment, a touch and display driver integration (TDDI) technology, in which a display driver integrated circuit (IC) and a touch panel controller IC are integrated in a single chip, may be applied to the in-cell touch panel. For example, a hybrid in-cell touch technology or an on-cell touch technology may be applied to the panel 10. The panel 10 may include, for example, a light emitting diode (LED) panel, an organic LED (OLED) panel, a cathode ray tube (CRT), a liquid crystal display (LCD) panel, a plasma panel, and an electroluminescence (EL) panel. A different display technology may be used.

Figure 2B:
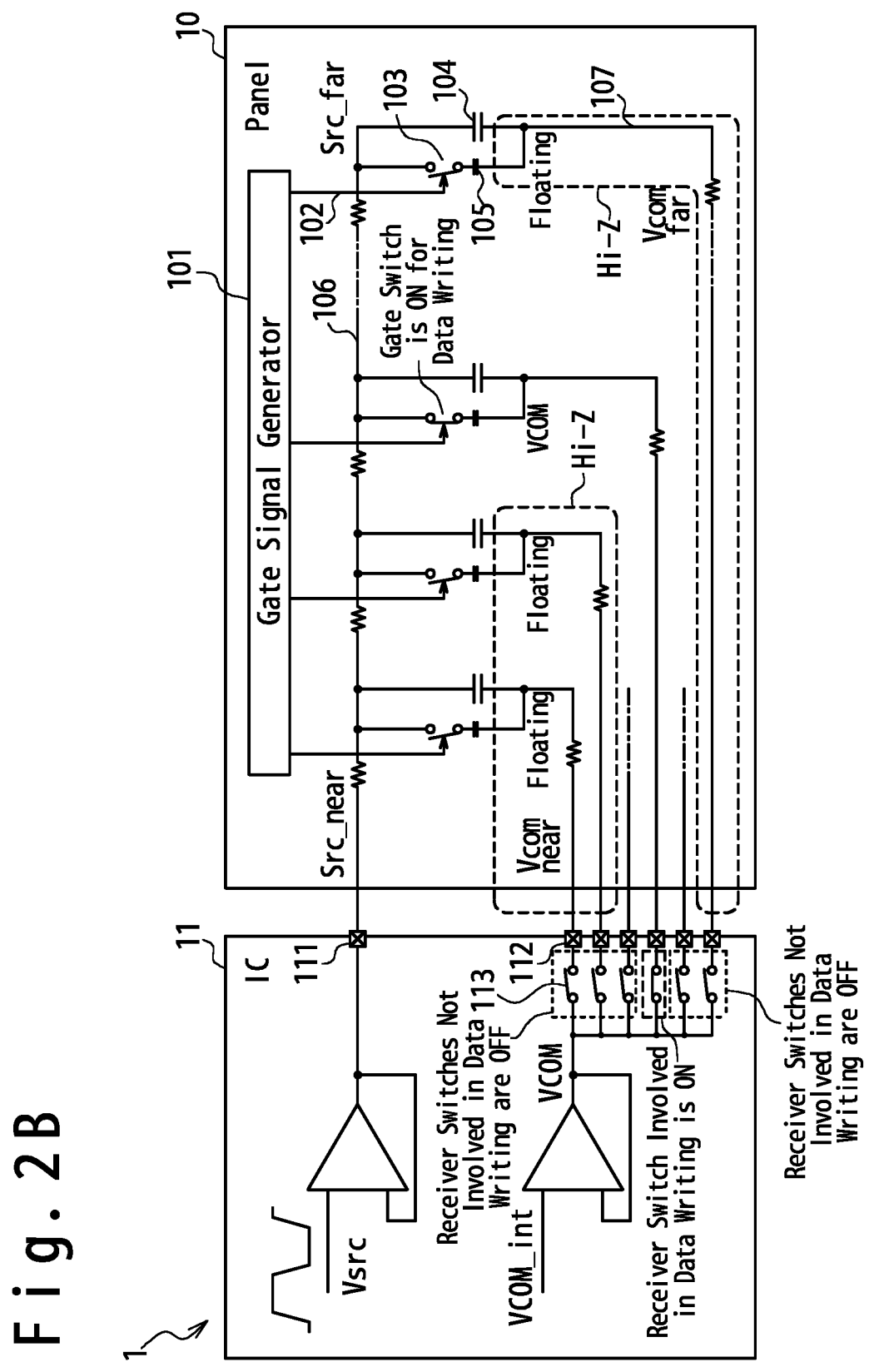

In one embodiment illustrated in FIGS. 2A and 2B, the display device 1 comprises the panel 10 and an integrated circuit (IC) 11. The panel 10 comprises a gate signal generator 101, gate lines 102, gate switches 103, parasitic capacitors 104, pixel capacitors 105, a source line 106, and VCOM lines 107.

The gate signal generator 101 generates gate signals for writing display data into pixels of the panel 10. The gate signal generator 101 are connected to the plurality of gate lines 102. The gate lines 102 are one example of data write lines. The gate signal generator 101 is driven to achieve scanning, and transmits generated gate signals to predetermined pixel regions of the panel 10. The pixel region may be also referred to as a tile. The gate signals are transmitted to achieve scanning in the pixel regions. The gate switches 103 operate as data write switches configured to switch data writing. The gate switches 103 are connected to the gate lines 102 to switch the gate signals between ON and OFF. When a gate switch 103 is ON, a gate signal is transmitted to a pixel region to write display data. When the gate switch 103 is OFF, no gate signal is transmitted to the pixel region and no display data is written into the pixel region. Display data are sequentially written into different pixel regions by switching the gate switches 103 between ON and OFF.

Figure 3A:
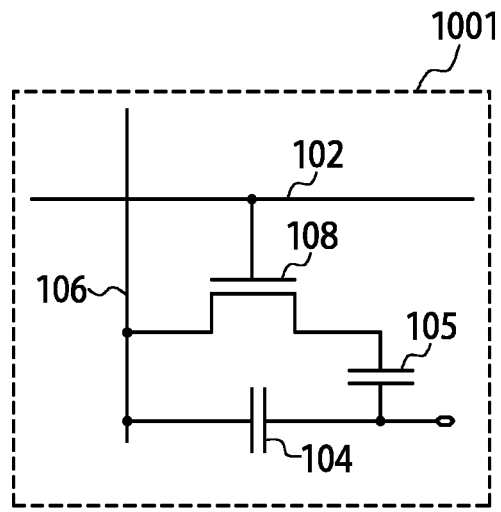
FIG. 3A illustrates an example configuration of a pixel of the panel, according to one embodiment.

The parasitic capacitors 104 are generated between the receiver electrodes 112 of IC 11 and the source line 106. A parasitic capacitor 104 and a pixel capacitor 105 are incorporated in a pixel 1001 as illustrated in FIG. 3A. A receiver electrode may be also referred to as an RX electrode.

As illustrated in FIG. 3A, each pixel 1001 in the panel 10 is formed of a gate line 102, a source line 106, a parasitic capacitor 104, a pixel capacitor 105, and a thin film transistor (TFT) 108. Gate signals are sequentially transmitted over the gate lines 102 to turn on the TFTs 108 in units of scan signals. Source signals are transmitted over the source lines 106 and thereby signal voltages corresponding to display data are applied to the TFTs 108 and the pixel capacitors 105 control transparent states of liquid crystal elements. This achieves displaying an image based on display data on the panel 10 with desired grayscale levels.

Figure 3B:
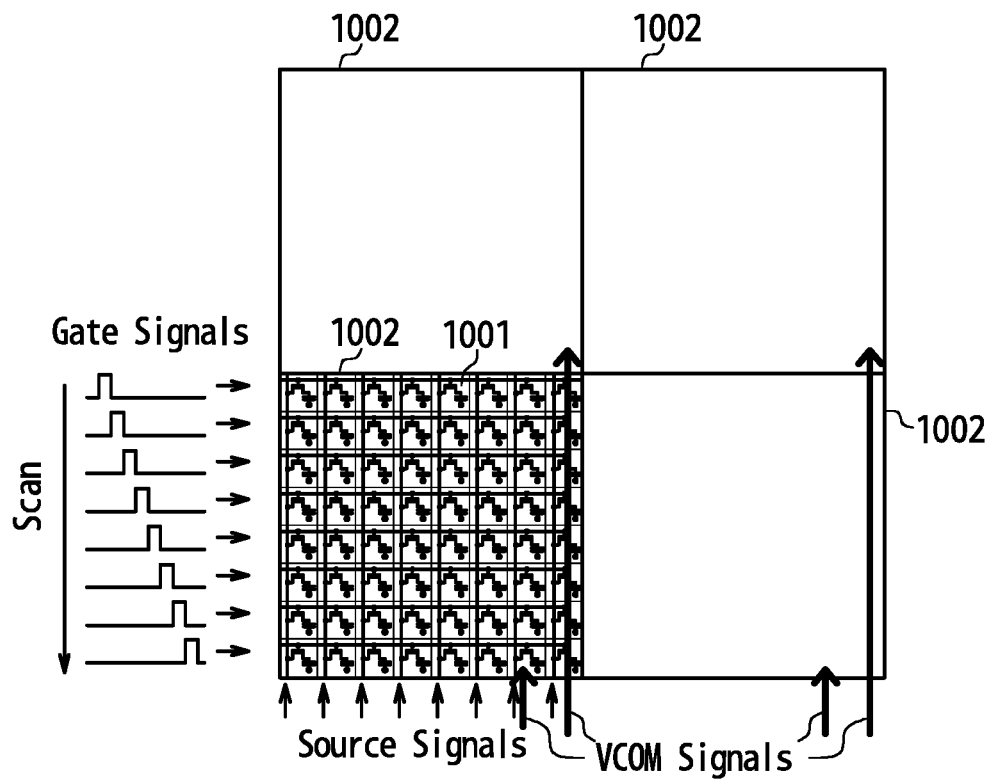
FIG. 3B illustrates an example configuration of a tile of the panel, according to one embodiment.

As illustrated in FIG. 3B, a plurality of pixels 1001 form a tile 1002. The number of pixels that form a tile 1002 is arbitrary, not limited to the number exemplarily illustrated in FIG. 3B. Through gate scanning, gate signals are sequentially transmitted to the respective gate lines 102 in each tile 1002. Display data are written into pixels that receive signal voltages corresponding to the display data in the gate signals. Subsequently, gate signals are sequentially transmitted to the gate lines 102 in a tile 1002 to be scanned next, and display data are written into pixels based on signal voltages in the gate signals for the respective gate lines 102. A similar process is repeated in the gate scanning.

In one embodiment, pixel regions each comprise one or more pixels 1001. For example, the pixel regions are associated with the receiver electrodes 112, respectively, and each comprise one or more pixels to which VCOM signals are transmitted from the respective receiver electrodes 112. A pixel region comprises one or more pixels, and accordingly a tile 1002 comprises one or more pixel regions.

Referring back to FIGS. 2A and 2B, the source line 106 transmits a source signal from a source electrode 111.

The VCOM lines 107 transmit VCOM signals from the receiver electrodes 112.

The IC 11 incorporates the source electrode 111, the plurality of receiver electrodes 112, and receiver switches 113. The IC 11 is one example of a display driver.

The source electrode 111 is connected to the source line 106 and transmits a source signal to the source line 106 to supply a source voltage. The IC 11 may comprise a plurality of source electrodes 111.

The receiver electrodes 112 function as VCOM electrodes. The VCOM electrodes may be also referred to as common electrodes. The receiver electrodes 112 transmit the VCOM signals to the tiles 1002 via the VCOM lines 107 connected thereto to supply a VCOM voltage. Each receiver electrode 112 is connected to one receiver switch 113. The receiver switches 113 provide switching of the VCOM signals between ON and OFF. When a receiver switch 113 is in an "ON" state, a VCOM signal is transmitted to a tile 1002. When the receiver switch 113 is in an "OFF" state, no gate signal is transmitted to the tile 1002, and no display data are written. The receiver switches 113 may be incorporated in a multiplexer. The multiplexer may be also referred to as MUX. For example, the IC 11 comprises switch control circuitry configured to control the receiver switches 113. If all of the receiver switches are turned ON to allow all of the receiver electrodes to supply the VCOM voltage while display data are written into respective pixels in a pixel region, the parasitic capacitances between the source line and the VCOM lines increase, since the receiver electrodes supply the VCOM voltage to pixels into which display data are not being written. This increases power consumption and the write time of the display data.

The embodiment illustrated in FIGS. 2A and 2B achieves selection of receiver electrodes 112 obliged to supply the VCOM voltage by individually controlling the respective receiver switches 113, while display data are being written into a pixel region.

Referring to FIG. 2A, when a gate switch 103 is ON and display data are being written into a corresponding pixel region, one or more but not all of the receiver switches 113 are turned OFF, and receiver electrodes 112 associated with the receiver switches 113 that are turned OFF do not supply the VCOM voltage. For example, to prohibit receiver electrodes 112 associated with pixel regions into which display data are not being written from supplying the VCOM voltage, the receiver switches 113 connected to such receiver electrodes 112 are turned OFF. This causes the VCOM lines 107 connected to the receiver electrodes 112 associated with the pixel regions into which display data are not being written to be floating. That is, the output signal states of such VCOM lines 107 are set to high-impedance (Hi-Z), in which the signals are not driven. To allow a receiver electrode 112 associated with a pixel region into which display data are being written to supply the VCOM voltage, the receiver switch 113 connected to this receiver electrode 112 is turned ON.

In FIG. 2B, as a result of gate scanning, the pixel region into which display data are being written is changed from the pixel region involved in data writing illustrated in FIG. 2A. To prevent relevant receiver electrodes 112 from supplying the VCOM voltage to pixel regions which are not involved in data writing, which are different from those illustrated in FIG. 2A, the receiver switches 113 connected to the relevant receiver electrodes 112 are turned OFF. Meanwhile, to allow a relevant receiver electrode 112 to supply the VCOM voltage to a pixel region involved in data writing, the receiver switch 113 connected to the relevant receiver electrode 112 is turned ON.

In the example illustrated in FIG. 2B, a receiver electrode 112 transmits a VCOM signal to a pixel region into which display data are being written, through control of the receiver switches 113.

In embodiments illustrated in FIGS. 4A and 4B, switches 114 are disposed between the receiver electrodes 112 and the ground (GND), in addition to the receiver switches 113. When a gate switch 103 is turned ON to write display data into a pixel region, one or more but not all of the receiver switches 113 are turned OFF, and the switches 114 associated with the receiver switches 113 that are turned OFF are turned ON to provide connections to ground. That is, the potentials of the receiver electrodes 112 associated with the switches 114 that are turned ON are set to GND. Accordingly, the receiver electrodes 112 associated with the receiver switches 113 that are turned OFF fail to (i.e., do not) supply the VCOM voltage. Meanwhile, so as to allow the receiver electrode 112 associated with the pixel region into which display data are being written to supply the VCOM voltage, the receiver switch 113 connected to this receiver electrode 112 is turned ON.

As thus described, the receiver switches 113 are individually switched between ON and OFF so that receiver electrodes 112 other than the receiver electrode 112 which supplies the VCOM voltage to the pixel region into which display data are being written are prohibited from supplying the VCOM voltage. This reduces a parasitic capacitance in the panel 10, shortens the write time of display data, and reduces charging and discharging currents.

In another embodiment, in gate scanning, the VCOM voltage is supplied to predetermined pixel regions, in addition to a pixel region into which display data are being written. For example, out of the plurality of receiver switches 113, receiver switches 113 associated with receiver electrodes 112 which supply the VCOM voltage to tiles 1002 adjacent in the gate scan direction to a tile 1002 into which display data are being written may be turned ON.

Figure 5A:
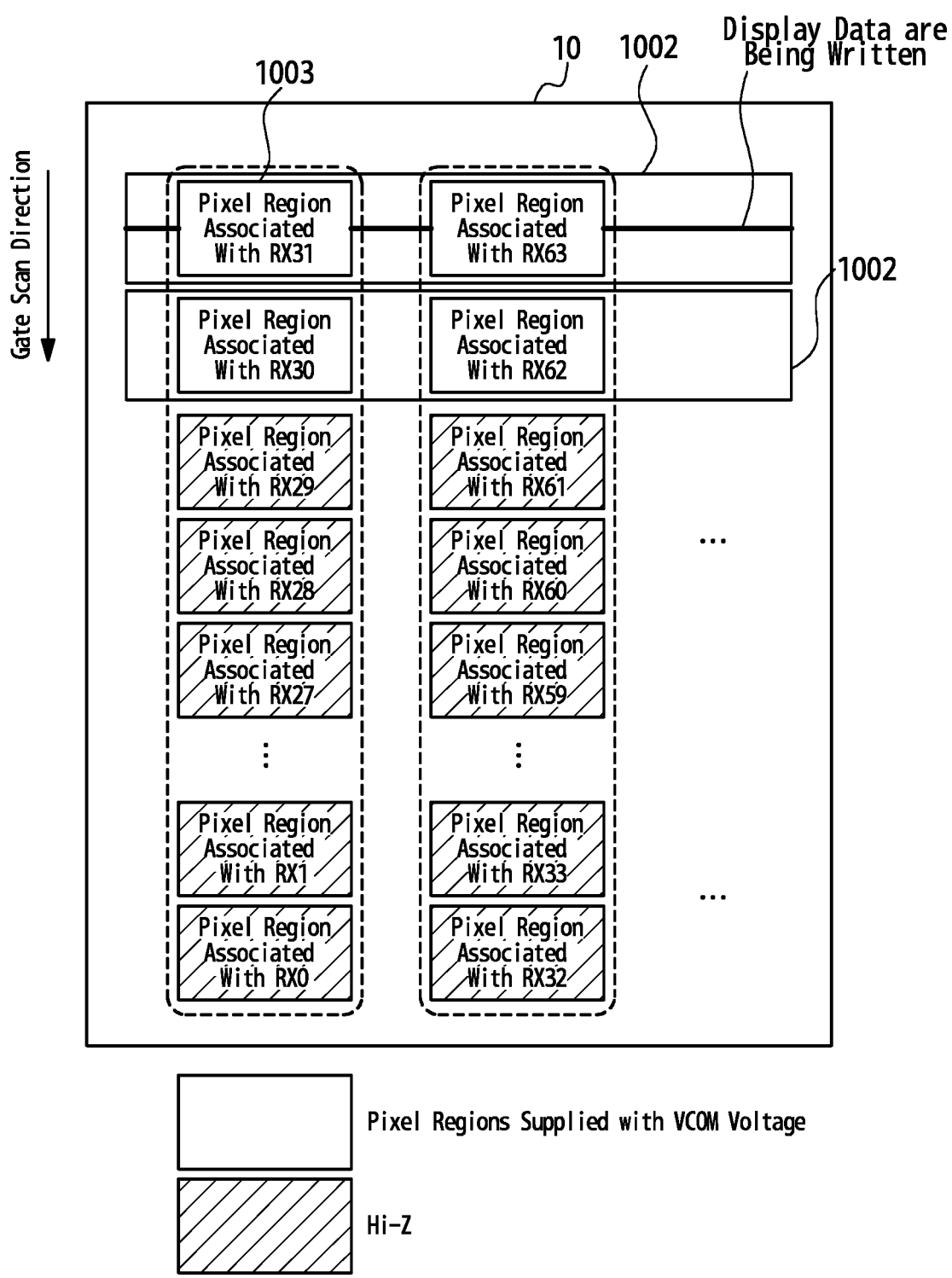
FIGS. 5A to 5C illustrate one example VCOM voltage control during gate scanning, according to one embodiment.
Figure 5B:
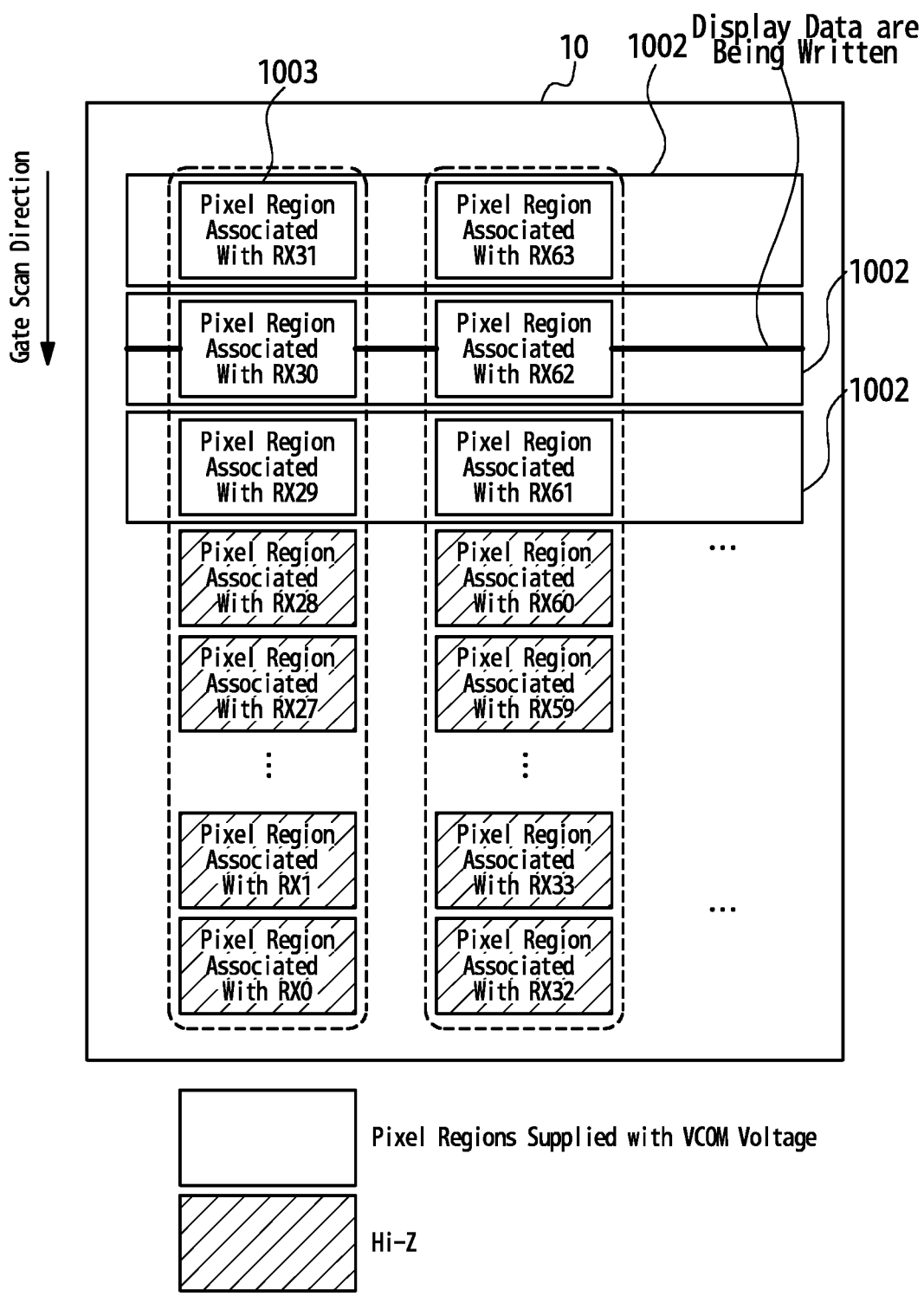
Figure 5C:
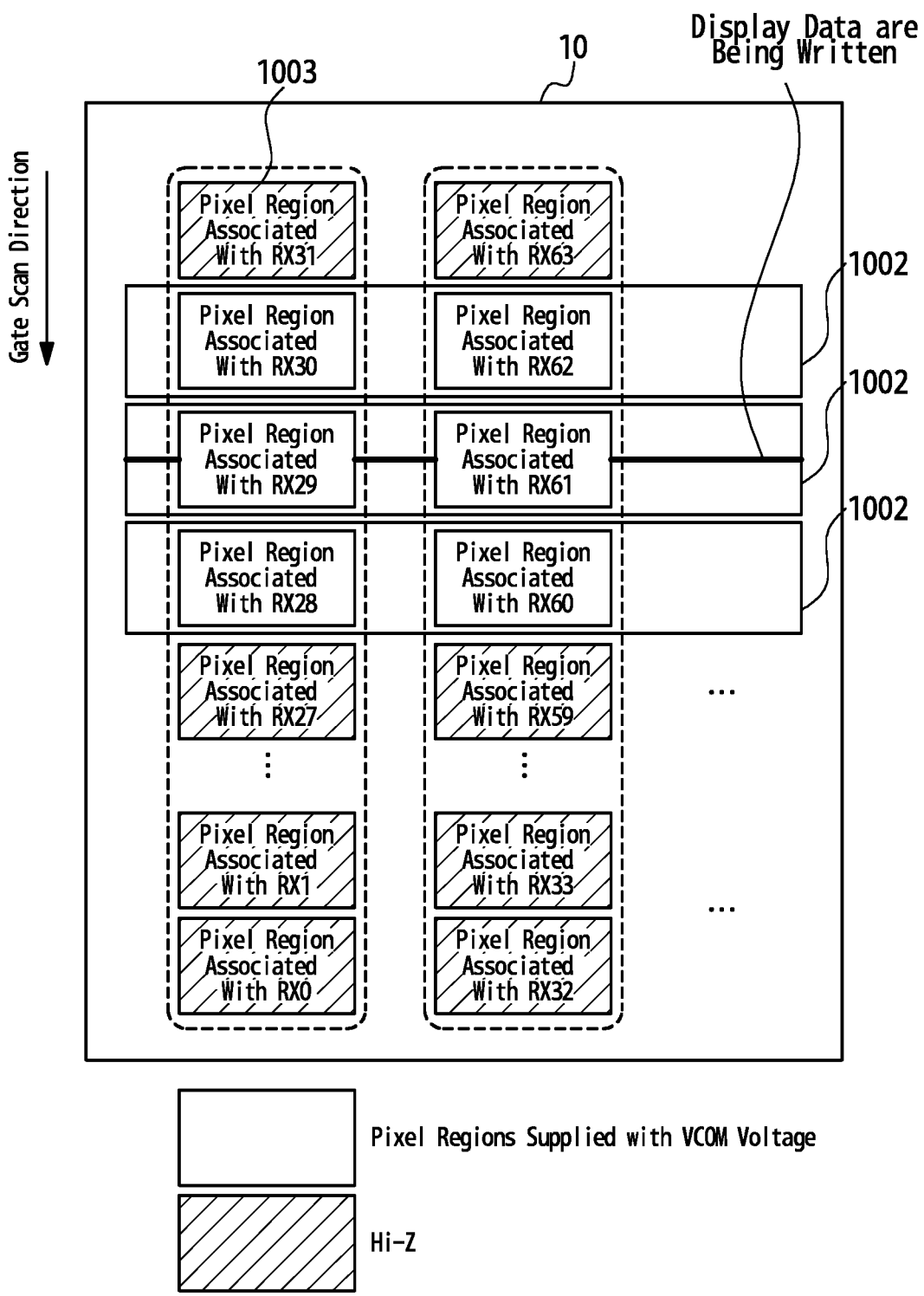

In FIGS. 5A, 5B, and 5C, RXO, RX1 ... RX63 denote different receiver electrodes 112. The pixel regions 1003 are associated with different receiver electrodes 112 (RX0, RX1 ... RX63), respectively. The receiver electrodes 112 supply the VCOM voltage to the pixel regions 1003 associated therewith, respectively.

The tile 1002 into which display data are written is changed from the first tile 1002 from the top in the panel 10, to the second tile 1002, and to the third tile 1002, and similarly for the rest.

The first tile 1002 comprises pixel regions 1003 associated with the receiver electrodes 112, RX31 and RX63. The second tile 1002 comprises pixel regions 1003 associated with the receiver electrodes 112, RX30 and RX62. The third tile 1002 comprises pixel regions 1003 associated with the receiver electrodes 112, RX29 and RX61.

FIGS. 5A, 5B, and 5C illustrate VCOM voltage control during gate scanning.

In FIG. 5A, receiver switches 113 associated with the first tile 1002, into which display data are being written, and with the second tile 1002, into which display data are to be written next, are turned ON to supply the VCOM voltage from the associated receiver electrodes 112. The remaining pixel regions in FIG. 5A fail to receive the VCOM voltage through control of the receiver switches 113 and are placed into a Hi-Z state.

In the example illustrated in FIG. 5B, the receiver switches 113 associated with the first tile 1002, into which display data have been written before the second tile 1002 in the gate scan direction, and with the third tile 1002, into which display data are to be written after the second tile 1002, are turned ON to supply the VCOM voltage from the relevant receiver electrodes 112. The remaining pixel regions in FIG. 5B fail to receive the VCOM voltage through control of the receiver switches 113 and are placed into the Hi-Z state.

In the example illustrated in FIG. 5C, the receiver switches 113 associated with the second tile 1002, into which display data have been written before the third tile 1002 in the gate scan direction, and with the fourth tile 1002, into which display data are to be written after the third tile 1002, are turned ON to supply the VCOM voltage from the relevant receiver electrodes 112. The remaining pixel regions in FIG. 5C fail to receive the VCOM voltage through control of the receiver switches 113 and are placed into the Hi-Z state.

As thus described, the receiver switches 113 associated with the tile (or pixel regions) into which display data are being written and the tiles adjacent to the same in the gate scan direction and its opposite direction are turned ON to supply the VCOM voltage from the associated receiver electrodes 112. The number of tiles adjacent to the tile into which display data are being written is arbitrary.

In another embodiments, sizes and positions, for example, of pixel regions to which the VCOM voltage is supplied (such as the number of tiles) may be dynamically changed depending on the position or timing of the gate scanning.

Figure 6A:
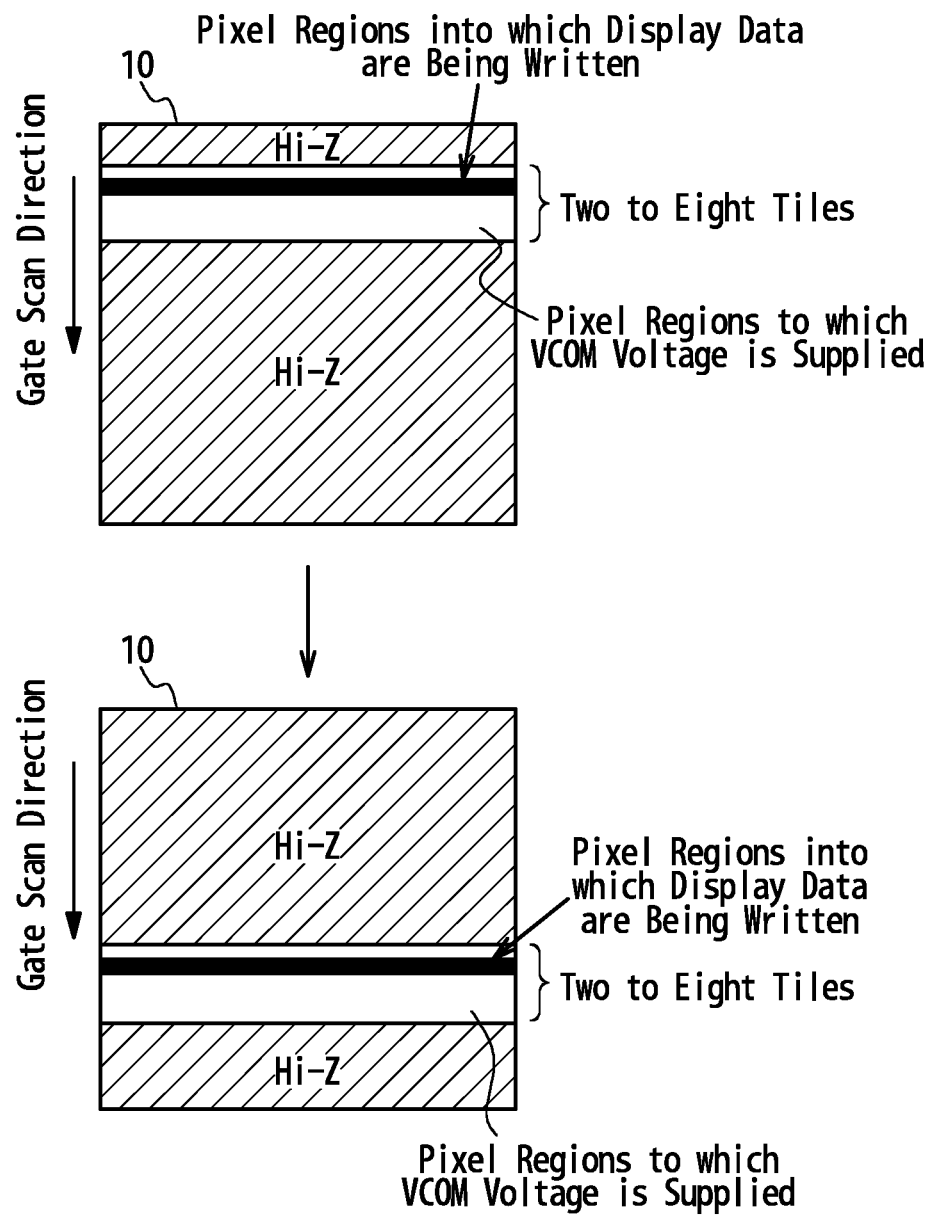
FIG. 6A is a schematic diagram illustrating one example VCOM voltage control during gate scanning, according to one embodiment.

For example, the VCOM voltage is supplied to two to eight tiles including pixel regions into which display data are being written, as illustrated in the top diagram of FIG. 6A. When the position or timing of the gate scanning is changed as illustrated in the bottom diagram of FIG. 6A, for example, the VCOM voltage is supplied to two to eight tiles including pixel regions into which display data are being written.

Figure 6B:
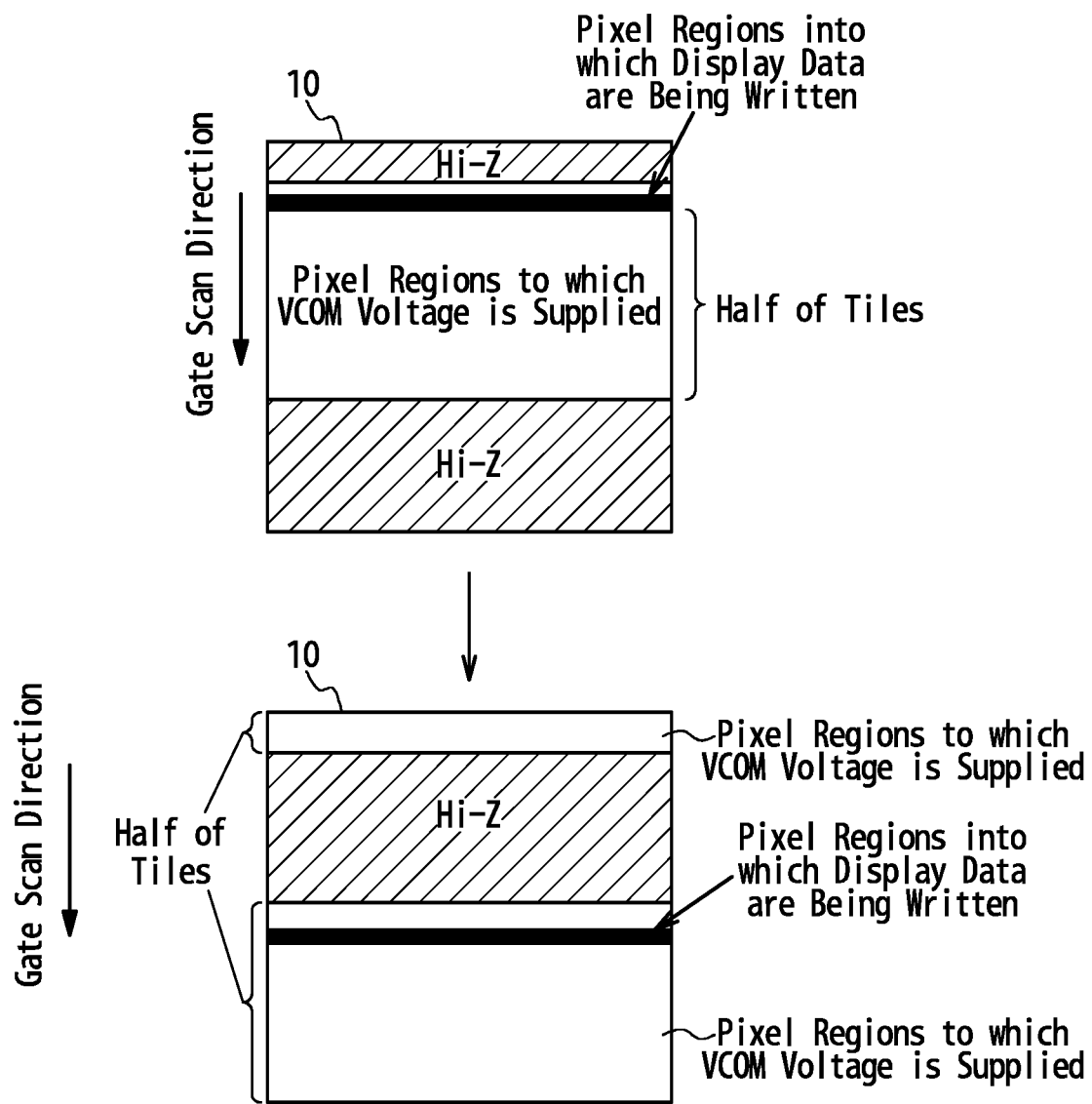
FIG. 6B is a schematic diagram illustrating one example VCOM voltage control during gate scanning, according to one embodiment.

As illustrated in the top diagram of FIG. 6B, for example, the VCOM voltage is supplied to half of the tiles including pixel regions into which display data are being written. In the bottom diagram of FIG. 6B, the range of pixel regions to which the VCOM voltage is supplied is half of tiles, similarly to that illustrated in the top diagram of FIG. 6A, while the pixel regions to which the VCOM voltage are positioned at two separated positions.

FIGS. 7, 8A, 8B, 9A, and 9B illustrate timing of switching control of the gate switches 103 and the receiver switches 113.

Figure 7:
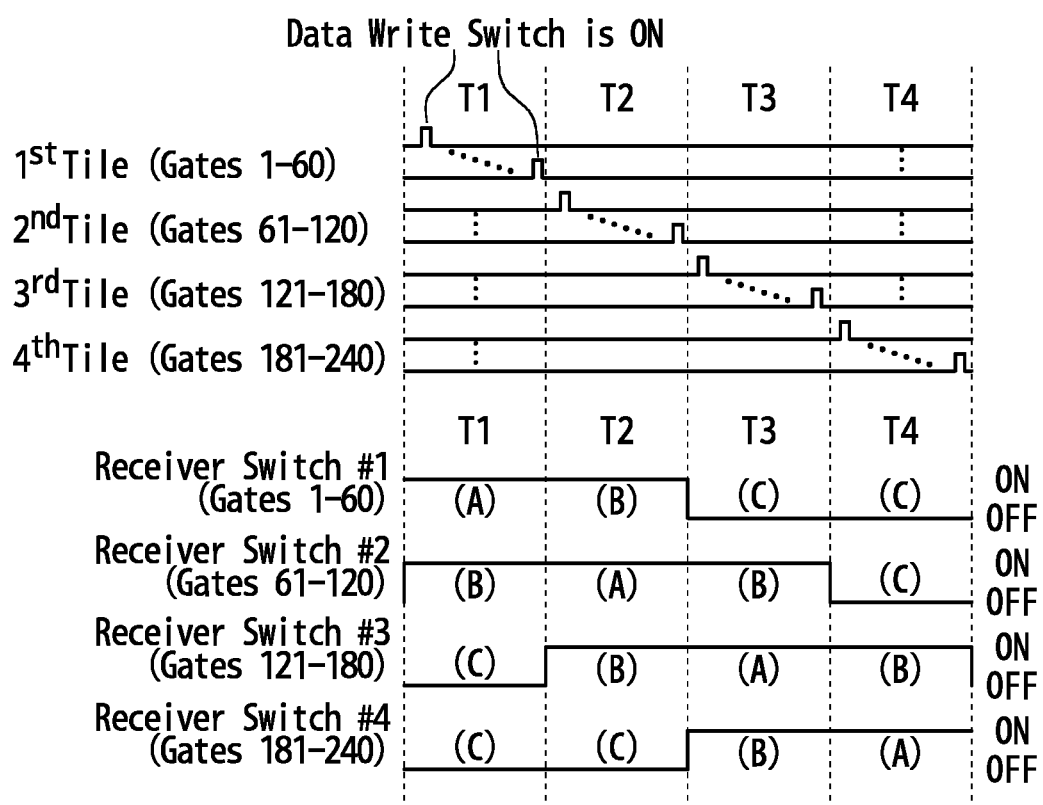
FIG. 7 illustrates one example switching timing of VCOM voltage supply during gate scanning, according to one embodiment.

In FIG. 7, during time T1, for example, the gate switches 103 associated with gates 1-60 that transmit gate signals to the first tile 1002 are turned ON to write data into the first tile 1002. The receiver switch #1 associated with the first tile 1002 is turned ON during time T1 to supply the VCOM voltage to the first tile 1002, into which display data are being written. During time T1, the receiver switch #2 associated with the second tile 1002 is turned ON. The second tile 1002 is adjacent in the gate scan direction to the first tile 1002 into which the display data are being written.

During time T2, as a result of gate scanning, the gate switches 103 associated with gates 61-120 which transmit gate signals to the second tile are turned ON to write data into the second tile 1002. The receiver switch #2 associated with the second tile 1002 is turned ON during time T2 to supply the VCOM voltage to the second tile 1002, into which display data are being written. During time T2, the receiver switches #1 and #3 associated with the first and third tiles 1002 which are adjacent in the gate scan direction and is in opposite direction to the second tile 1002, into which the display data are being written.

As thus described, in FIG. 7, in gate scanning, the receiver switches 113 are controlled between ON and OFF so that the VCOM voltage is supplied to three tiles 1002, including the tile 1002 into which display data are being written, during and after time T2. Although FIG. 7 illustrates the example in which the three tiles 1002 including the tile 1002 into which the display data are being written are adjacent one another in the gate scan direction, in one embodiment, the VCOM voltage is supplied to multiple tiles 1002 which are not adjacent to each other, by turning ON the relevant receiver switches 113.

Figure 8B:
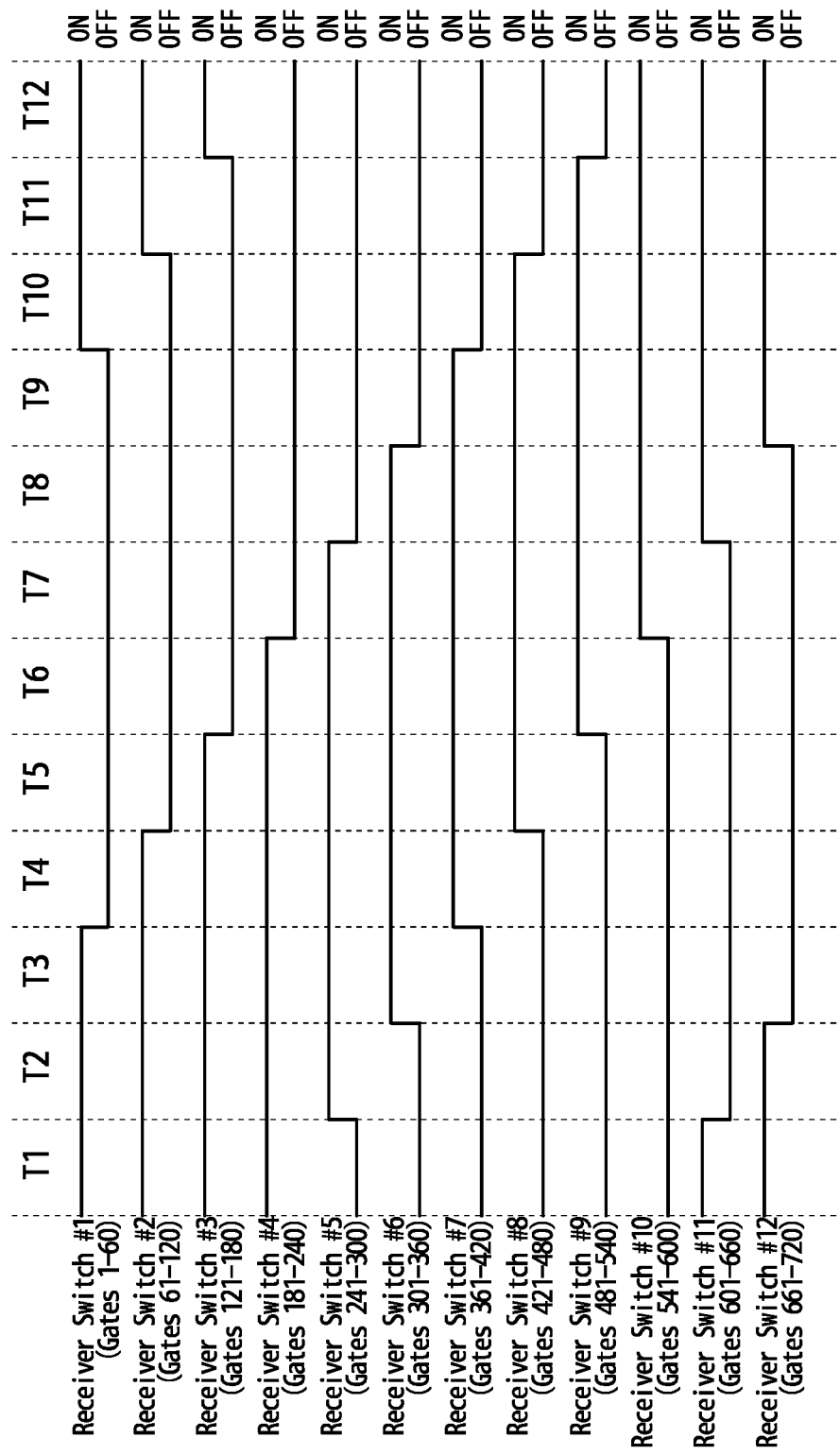
FIG. 8B illustrates one example switching timing of VCOM voltage supply by receiver switches during gate scanning, according to one embodiment.

FIGS. 8A and 8B illustrate ON/OFF states of the gate switches 103 and the receiver switches 113, respectively, in performing gate scanning during times T1 to T12. Times T1 to T12 in FIG. 8A correspond to times T1 to T12 in FIG. 8B, respectively. FIG. 8B illustrates an example in which the receiver switches 113 are controlled between ON and OFF so that the VCOM voltage is supplied from the receiver electrodes 112 to six tiles 1002 including a tile 1002 into which display data are being written.

Figure 9B:
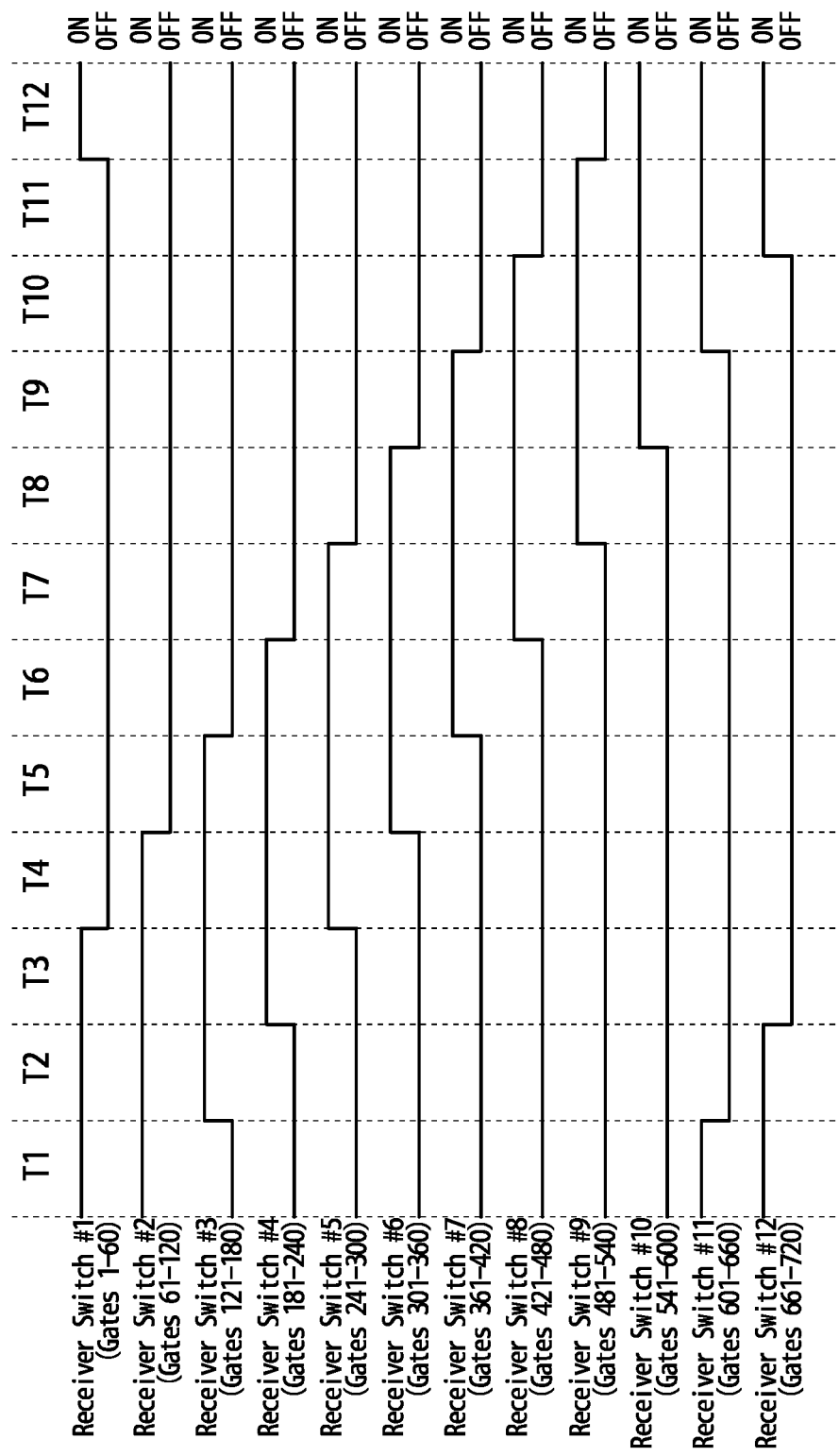
FIG. 9B illustrates one example switching timing of VCOM voltage supply by receiver switches during gate scanning, according to one embodiment.

FIGS. 9A and 9B illustrate ON/OFF states of the gate switches 103 and the receiver switches 113, respectively, in performing gate scanning during times T1 to T12. Times T1 to T12 in FIG. 9A correspond to times T1 to T12 in FIG. 9B, respectively. FIG. 9B illustrates an example in which the receiver switches 113 are controlled between ON and OFF so that the VCOM voltage is supplied from the receiver electrodes 112 to four tiles 1002 including a tile 1002 into which display data are being written.

The timing of control of the receiver switches 113 between ON and OFF is not limited to those illustrated in FIGS. 7, 8A and 8B; the receiver switches 113 may be controlled between ON and OFF at arbitrary timing.

As thus described, the receiver switches 113 may control ON and OFF of the VCOM voltage so that a predetermined number of receiver electrodes 112 supply the VCOM voltage while display data are being written to a predetermined pixel region.

Figure 10:
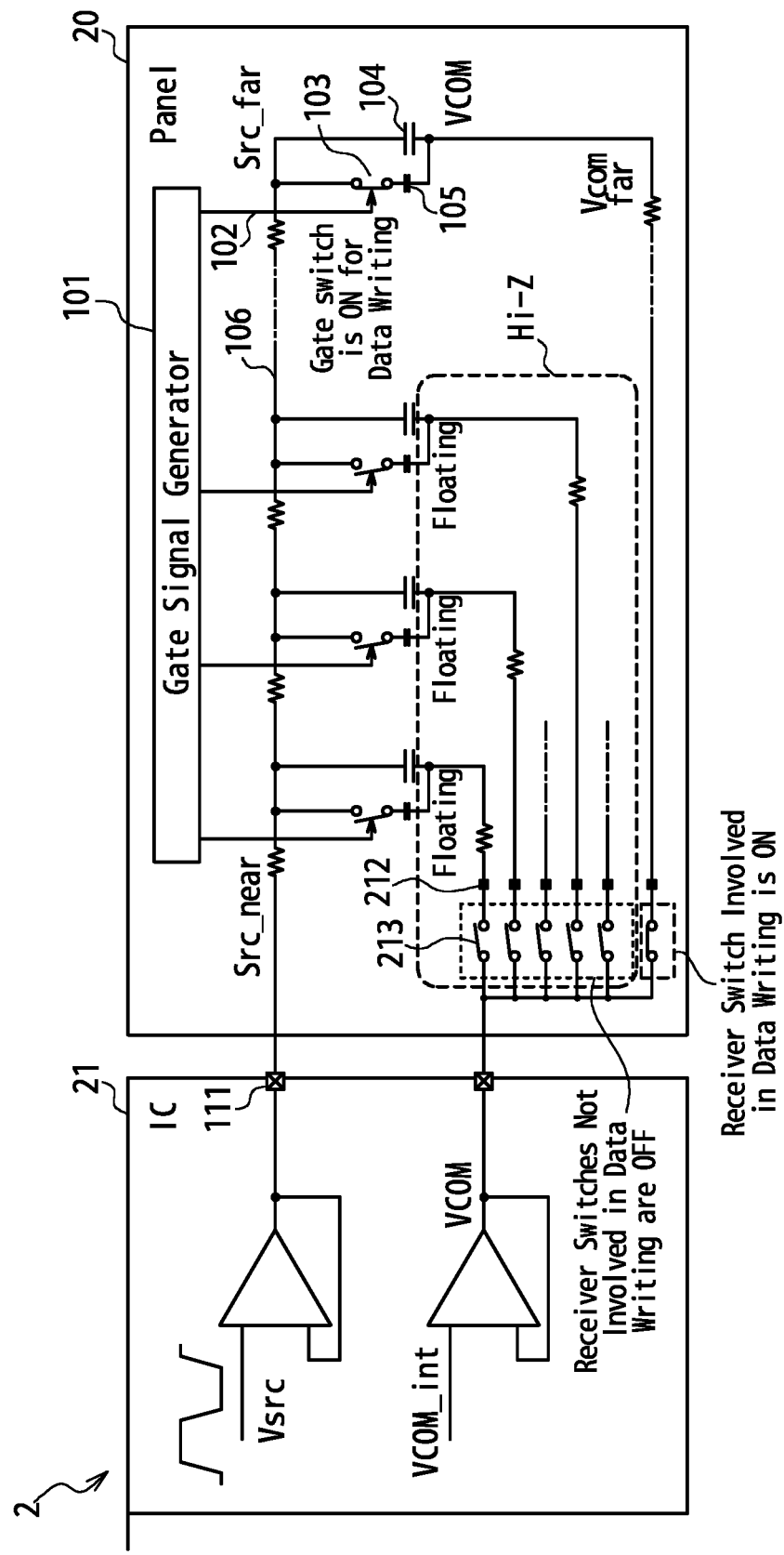
FIG. 10 illustrates example configurations of an IC and a panel of a display device, according to one example.

In one embodiment illustrated in FIG. 10, a panel 20 of a display device 2 comprises receiver electrodes 212 and receiver switches 213. The display device includes IC 21. In FIG. 10, the same components as those included in the panel 10 and the IC 11 illustrated in FIG. 2A are denoted by the same reference numerals. The receiver electrodes 212 and the receiver switches 213 have similar functions to those of the receiver electrodes 112 and the receiver switches 113 in the above-described embodiments and examples. The technologies disclosed in the above-described embodiments and examples may be applied to the display device 2.

In this display device 2, receiver electrodes 112 other than those which supply the VCOM voltage to pixel regions into which display data are being written do not supply the VCOM voltage. This reduces the parasitic capacitance in the panel 10, shortens the display data write time, and reduces the charging and discharging currents.

The above-described embodiments may be combined. Although this disclosure recites only a limited number of embodiments, a person skilled in the art benefited from this disclosure would appreciate that various different embodiments may be devised without departing from the scope of this invention. Accordingly, the scope of this invention should be demarcated only with the claims.

The invention claimed is:

1. A display device comprising:
a display panel comprising a plurality of pixel regions each comprising one or more pixels;
a plurality of receiver electrodes respectively associated with the plurality of pixel regions and configured to supply a VCOM voltage; and
data write lines configured to transmit data write signals to write display data into the plurality of pixel regions,
wherein, during a period overlapping with when the display data is written into one or more but not all of the plurality of pixel regions, a first receiver electrode of the plurality of receiver electrodes supplies the VCOM voltage and a second receiver electrode of the plurality of receiver electrodes simultaneously does not supply the VCOM voltage.

2. The display device, according to claim 1, wherein the first receiver electrode of the plurality of receiver electrodes is associated with a first pixel region of the plurality of pixel regions written with the display data.

3. The display device according to claim 2, wherein a third receiver electrode of the plurality of receiver electrodes is associated with a second pixel region of the plurality of pixel regions, the third receiver electrode supplies the VCOM voltage until writing of the display data into the first pixel region is completed, wherein the display data is written into the second pixel region before the display data is written in to the first pixel region.

4. The display device according to claim 1, wherein during the period overlapping with when the display data is written into one or more but not all of the plurality of pixel regions, a third receiver electrode of the plurality of receiver electrodes supplies the VCOM voltage.

5. The display device according to claim 1 further comprising:
a plurality of switches, each switch of the plurality of switches associated with a respective one of the plurality of receiver electrodes, the plurality of switches are configured to control the supply of the VCOM voltage from the plurality of receiver electrodes.

6. The display device according to claim 1 further comprising a plurality of tiles, each of the plurality of tiles comprising one or more pixel regions of the plurality of pixel regions, and wherein the display data is sequentially written into the plurality of tiles.

7. The display device according to claim 6 further comprising:
a plurality of switches configured to control the supply of the VCOM voltage to the plurality of tiles.

8. The display device according to claim 7, wherein the plurality of switches is configured to sequentially control the supply the VCOM voltage to the plurality of tiles.

9. The display device according to claim 1 further comprising an integrated circuit (IC), wherein the IC comprises the plurality of receiver electrodes.

10. The display device according to claim 1, wherein the display panel comprises the plurality of receiver electrodes.

11. The display device according to claim 1, wherein the one or more of the plurality of receiver electrodes are set to high-impedance or the one or more of the plurality of receiver electrodes are connected to ground.

12. A method of controlling a voltage supplied to a plurality of pixel regions of a display panel of a display device, the method comprising:
transmitting, via display write lines of the display panel, data write signals for writing display data into one or more but not all of the plurality of pixel regions; and supplying, during a period overlapping with when the display data is written into the one or more of the plurality of pixel regions, a VCOM voltage with a first receiver electrode of a plurality of receiver electrodes, and simultaneously not supplying the VCOM voltage with a second receiver electrode of the plurality of receiver electrodes.

13. The method according to claim 12, wherein the VCOM voltage is supplied to a first pixel region of the plurality of pixel regions into which the display data is being written from the first receiver electrode associated with the first pixel region.

14. The method according to claim 12, wherein the display data is sequentially written into the plurality of pixel regions.

15. The method according to claim 12 further comprising controlling, via a plurality of switches of the display device, the supply of the VCOM voltage, the plurality of switches are associated with the plurality of receiver electrodes.

16. A display driver comprising:
a plurality of receiver electrodes respectively associated with a plurality of pixel regions, and configured to supply a VCOM voltage, wherein each of the plurality of pixel regions comprises one or more pixels of a display panel of a display device,
wherein data write signals for writing display data into the plurality of pixel regions are supplied to one or more but not all of the plurality of pixel regions, and
wherein, during a period overlapping with when the display data is written into the one or more of the plurality of pixel regions, a first receiver electrode of the plurality of receiver electrodes supplies the VCOM voltage, and a second receiver electrode of the plurality of receiver electrodes simultaneously does not supply the VCOM voltage.

17. The display driver according to claim 16, wherein the first receiver electrode is associated with a first pixel region of the plurality of pixel regions into which the display data are being written.

18. The display driver according to claim 17, wherein a third receiver electrode of the plurality of receiver electrodes is associated with a second pixel region of the plurality of pixel regions and supplies the VCOM voltage until writing of the display data into the first pixel region is completed, wherein the display data is written into the second pixel region before the display data is written in to the first pixel region.

19. The display driver according to claim 16, wherein the supply of the VCOM voltage is controlled via a plurality of switches of the display device, each of the plurality of switches is associated with a respective one of the plurality of receiver electrodes.

20. The display driver according to claim 16, wherein the display device further comprises a plurality of tiles, each of the plurality of tiles comprising one or more pixel regions of the plurality of pixel regions, and wherein the display data is sequentially written into the plurality of tiles.

* * * * *

UNITED STATES PATENT AND TRADEMARK OFFICE
CERTIFICATE OF CORRECTION

PATENT NO. : 11,204,669 B2
APPLICATION NO. : 16/755447
DATED : December 21, 2021
INVENTOR(S) : S. Nohtomi It is certified that error appears in the above-identified patent and that said Letters Patent is hereby corrected as shown below:

In the Claims

| Column | Line | Claim | |
|--------|------|-------|---|
| 8 | 28 | 3 | change "in to" to -- into --. |
| 8 | 52 | 8 | change "supply the" to -- supply of the --. |
| 10 | 16 | 18 | change "in to" to -- into --. |

Signed and Sealed this
Sixth Day of December, 2022

Katherine Kelly Vidal
*Director of the United States Patent and Trademark Office*